(12) United States Patent
Gottanka et al.

(10) Patent No.: US 12,509,353 B2
(45) Date of Patent: Dec. 30, 2025

(54) PROCESS FOR PRODUCING POLYCRYSTALLINE SILICON GRANULATE

(71) Applicant: WACKER CHEMIE AG, Munich (DE)

(72) Inventors: Michael Gottanka, Neuoetting (DE); Harald Hertlein, Burghausen (DE); Benedikt Koeninger, Fuerth (DE)

(73) Assignee: WACKER CHEMIE AG, Munich (DE)

( * ) Notice: Subject to any disclaimer, the term of this patent is extended or adjusted under 35 U.S.C. 154(b) by 529 days.

(21) Appl. No.: 18/016,155

(22) PCT Filed: Jul. 17, 2020

(86) PCT No.: PCT/EP2020/070298
§ 371 (c)(1),
(2) Date: Jan. 13, 2023

(87) PCT Pub. No.: WO2022/012755
PCT Pub. Date: Jan. 20, 2022

(65) Prior Publication Data
US 2023/0286809 A1    Sep. 14, 2023

(51) Int. Cl.
*C01B 33/03*    (2006.01)
*B01J 8/18*    (2006.01)

(52) U.S. Cl.
CPC ............. *C01B 33/03* (2013.01); *B01J 8/1809* (2013.01); *B01J 8/1827* (2013.01); *B01J 8/1836* (2013.01);
(Continued)

(58) Field of Classification Search
CPC .... B01J 2208/00061; B01J 2208/00548; B01J 2208/00663; B01J 2208/00725;
(Continued)

(56) References Cited

U.S. PATENT DOCUMENTS 6,007,869 A * 12/1999 Schreieder ............. B01J 19/126
427/255.18
2008/0299291 A1 * 12/2008 Weidhaus ............. C01B 33/027
427/213

(Continued)

FOREIGN PATENT DOCUMENTS

DE    102013208071 A1    11/2014
EP    1990314 A2    11/2008
(Continued)

*Primary Examiner* — Alexandra M Moore
*Assistant Examiner* — Jordan W Taylor
(74) *Attorney, Agent, or Firm* — Brooks Kushman P.C.

(57) ABSTRACT

Silicon granulate is produced in a fluidized bed reactor having a fluidized bed region fluidized by a gas flow and heated by a heating apparatus. Seed particles and a feed gas including hydrogen and silane and/or halosilane is continuously supplied, and elemental silicon is deposited on the seed particles to form the silicon granulate, which is discharged as a continuous product stream from the reactor. The fluidized bed temperature affects the quality and formation of the product stream, which may be determined as the temperature of an offgas stream from the fluidized bend region. The temperature, as a responding variable may be determined and controlled by means of the mass and energy balance of a defined scheme.

20 Claims, 2 Drawing Sheets

(52) U.S. Cl.
CPC .............. *B01J 2208/00061* (2013.01); *B01J 2208/00548* (2013.01); *B01J 2208/00663* (2013.01); *B01J 2208/00725* (2013.01)

(58) Field of Classification Search
CPC ...... B01J 8/1809; B01J 8/1827; B01J 8/1836; C01B 33/029; C01B 33/03
See application file for complete search history.

(56) References Cited

U.S. PATENT DOCUMENTS

| | | |
|---|---|---|
| 2013/0280533 A1 | 10/2013 | Weckesser et al. |
| 2013/0295385 A1 | 11/2013 | Hertlein et al. |
| 2016/0236940 A1* | 8/2016 | Weckesser ............ C01B 33/027 |
| 2018/0297852 A1* | 10/2018 | Pedron ................. C01B 33/027 |

FOREIGN PATENT DOCUMENTS

| | | |
|---|---|---|
| EP | 2514521 A1 | 10/2012 |
| EP | 2653446 A2 | 10/2013 |
| EP | 2662334 A1 | 11/2013 |
| TW | 201442783 A | 11/2014 |

* cited by examiner

US 12,509,353 B2

PROCESS FOR PRODUCING POLYCRYSTALLINE SILICON GRANULATE

CROSS-REFERENCE TO RELATED APPLICATIONS

This application is the U.S. National Phase of PCT Application No. PCT/EP2020/070298 filed Jul. 17, 2020, the disclosure of which is incorporated in their entirety by reference herein.

BACKGROUND OF THE INVENTION

1. Field of Invention

The invention relates to a process for producing polycrystalline silicon granulate in a fluidized bed reactor, wherein as a responding variable the fluidized bed temperature $T_{WS}$ is determined as the temperature of an offgas stream $T_{offgas,WS}$ from the fluidized bed region by means of the mass and energy balance of a balance ambit I and/or a balance ambit II.

2. Description of the Related Art

Polycrystalline silicon granulate (hereinbelow referred to as granulate) is produced in a fluidized bed reactor (also known as a moving bed reactor). This is effected by fluidization of silicon seed particles by means of a gas flow in a fluidized bed, wherein said fluidized bed is heated to high temperatures by means of a heating apparatus. Addition of a silicon-containing reaction gas results in a deposition reaction on the hot particle surface, thus depositing elemental silicon on the seed particles. This causes the seed particles to increase in diameter. Regular withdrawal of particles that have grown in diameter and addition of further seed particles allows the process to be operated continuously. Employable silicon-containing reaction gases include for example halogen compounds (e.g., chlorosilanes or bromosilanes), monosilane ($SiH_4$) and mixtures of these gases with hydrogen. The deposition of the elemental silicon generates offgas composed of unconverted reaction gas and gaseous byproducts, in particular halosilanes.

Deposition processes and apparatuses for performing these are well known. Reference may be made here to EP1990314 A2 and EP2662334 A1 for example.

The temperature in the fluidized bed (fluidized bed temperature) generally defines essential product and process parameters. Precise adjustment of the fluidized bed temperature is essential for optimal product quality and economic process management.

Furthermore, an ideally constant low chlorine content is normally of great importance for the performance of granulate in a subsequent application. Performance is good for example when splattering effects during pulling of single-crystals can be minimized or avoided. Chlorine is in principle a primary impurity in granulate production. The chlorine content established in the granulate depends on process conditions in the fluidized bed reactor and in particular the fluidized bed temperature.

The fluidized bed temperature also exerts an influence on dust formation, specific energy consumption and reactor running time. Thus, precise and ideally instantaneous, temperature control is sought.

However, direct measurement of fluidized bed temperature, for example with a thermocouple, is disadvantageous since the presence of the thermocouple generally has a negative effect on process and/or product quality. Silicon may be continuously deposited on the thermocouple, thus limiting process running time. The product may also be contaminated by physical and chemical processes at the surface of the thermocouple. A fluidized bed reactor having an encapsulated pyrometer or thermocouple arranged in the reaction space is described for example in EP2514521 A1.

EP2653446 A2 describes a process for granulate production, wherein as the responding variable, the concentration of HCl in the offgas, is measured. As the concentration changes the rate of introduction of fresh seed particles and the output of the heating apparatus (i.e., manipulated variable) are controlled and adjusted. Here too, the temperature may be determined with a pyrometer.

Measurement of the fluidized bed temperature via a pyrometer is generally problematic since the beam path is disturbed due to dust formation. This makes precise temperature-dependent reactor control impossible.

The invention therefore had for its object to provide a process which allows undisturbed determination of fluidized bed temperature.

SUMMARY OF THE INVENTION

The foregoing and other objects are achieved by a process for producing granulate in a fluidized bed reactor. In a fluidized bed region of the reactor, continuously supplied seed particles are fluidized in a fluidized bed by means of a gas flow. The fluidized bed region is heated via the reactor wall with a heating apparatus. A supply of a feed gas stream comprising hydrogen and silane and/or halosilane causes elemental silicon to be deposited on the seed particles to form the granulate.

The granulate is discharged from the fluidized bed reactor as a product stream such that it is a continuous process. The fluidized bed temperature $T_{WS}$ (i.e., a responding variable) is determined as the temperature of an offgas stream $T_{offgas,WS}$ from the fluidized bed region $\dot{m}_{22,offgas,WS}$ by means of the mass and energy balance of a balance ambit I and/or a balance ambit II.

DETAILED DESCRIPTION OF THE PREFERRED EMBODIMENTS

Figure 1:
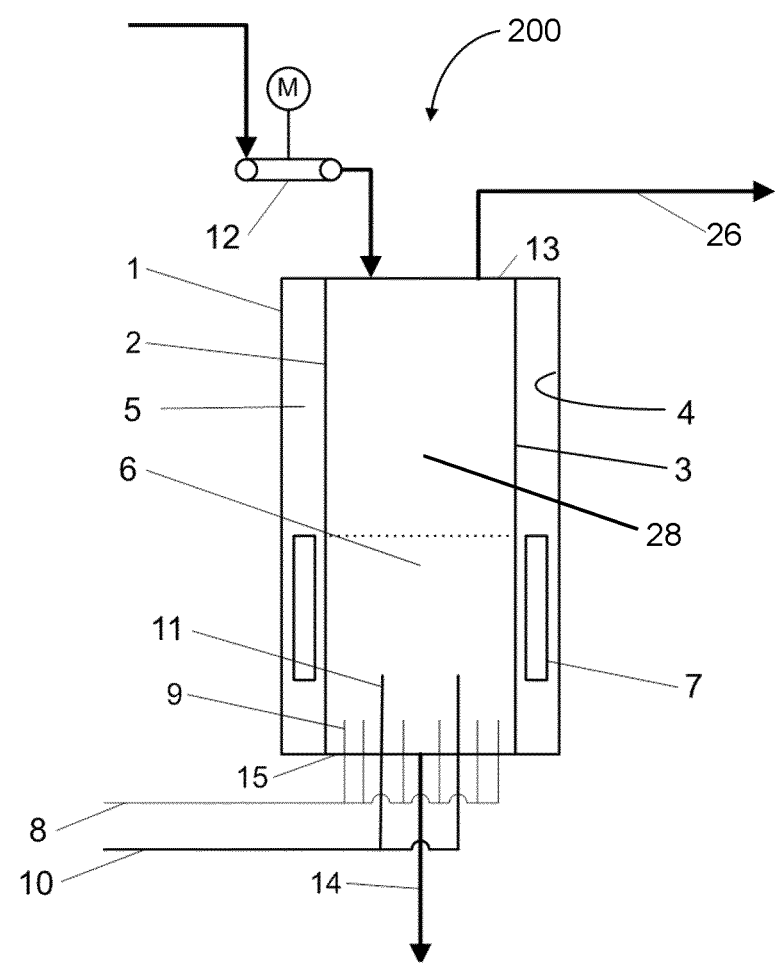
FIG. 1 shows a schematic view of an embodiment of a fluidized bed reactor.

The balance ambit I is formed from the enthalpy $\dot{H}_{26}$ of the feed gas stream $\dot{m}_{16,feedgas}$,
enthalpy $\dot{H}_{21}$ of a seed particle stream into the fluidized bed region $\dot{m}_{21,KP,WS}$,
enthalpy $\dot{H}_{18}$ of the product stream $\dot{m}_{18,Product}$,
enthalpy $\dot{H}_{22}$ of the offgas mass flow from the fluidized bed $\dot{m}_{22,offgas,WS}$,
reaction enthalpy $\Delta_R \dot{H}_{23}$,
heating output of the heating apparatus $Q_{20}$,
energy removal from the reactor in the fluidized bed region $Q_{24}$.

The enthalpy $\dot{H}_{22}$ of the offgas stream for the balance ambit I is given by equation (10).

$$\dot{H}_{22} = \dot{H}_{16} - \dot{H}_{18} - Q_{24} - \Delta_R \dot{H}_{23} + Q_{20} + \dot{H}_{21} \qquad (10)$$

The balance ambit II is formed from the
- enthalpy $\dot{H}_{21}$ of the seed particle stream into the fluidized bed region $\dot{m}_{21,KP,WS}$,
- enthalpy 117 of the seed particle stream into the reactor $\dot{m}_{17,KP,Reactor}$,
- enthalpy $\dot{H}_{22}$ of the offgas mass flow from the fluidized bed region $\dot{m}_{22,offgas,WS}$,
- enthalpy $\dot{H}_{19}$ of an offgas stream from the reactor $\dot{m}_{19,offgas,Reactor}$,
- energy removal from the reactor in the region above the fluidized bed $Q_{25}$.

The enthalpy $\dot{H}_{22}$ of the offgas stream for the balance ambit II is given by equation (11).

$$\dot{H}_{22} = -\dot{H}_{21} + \dot{H}_{17} - \dot{H}_{19} - Q_{25} \tag{11}$$

The fluidized bed temperature $T_{WS}$ is then given by equation (12).

$$T_{WS} = T_{offgas,WS} = \frac{\dot{H}_{22}}{\dot{m}_{22,offgas,WS} * c_{p,22}} \tag{12}$$

Wherein, $c_{p,22}$ is the heat capacity of the offgas stream.

According to the thus-determined responding variable $T_{WS}$ at least the heating output $Q_{20}$ is manipulated (i.e., a manipulated variable) and then controlled such that $Q_{20}$ is in a range from 0.5 to 3 kW, preferably from 1 to 2 kW, particularly preferably from 1.3 to 1.6 kW, per kilogram of silicon in the fluidized bed. Generally, upon falling below a target temperature $T_{WS}$ the heating output is increased and upon exceeding a target temperature $T_{WS}$ the heating output is reduced. The objective of the control is an economically optimal process management which ensures a constant product quality, in particular with respect of the chlorine content. The reactor can be affected by disturbance variables (for example a different fluidization of the fluidized bed due to variations in particle size) and $T_{WS}$, and thus the chlorine content in the product can therefore vary.

The primary manipulated variable for the control is $T_{WS}$ which corresponds to the calculated offgas temperature from the fluidized bed according to the energy balance (primary control). In the case of deviation control is effected by alteration of manipulated variables. $Q_{20}$ serves as a manipulated variable. If a target value of $T_{WS}$ is not achieved $Q_{20}$ is increased and if $T_{WS}$ is exceeded $Q_{20}$ is reduced.

For elucidation of the balance ambit I and II FIG. 1 initially shows the general construction of a fluidized bed reactor 200. This comprises a reactor vessel 1 having a reactor tube 2, which may optionally be segmented, inside it. The reactor tube 2 is clamped between a reactor top 13 and a reactor bottom 15. Between an inner wall 4 of the reactor vessel 1 and an outer wall 3 of the reactor tube 2 is an interspace 5. This typically contains insulation material and may be filled with an inert gas. The pressure in the interspace 5 is typically higher than inside the reactor tube 2. The reactor interior contains a fluidized bed region 6, which in operation contains the fluidized bed, and a region 28 above the fluidized bed region 6. The fluidized bed region 6 is heated by means of a heating apparatus 7. In the region 28, an unheated expansion zone, the cross sectional area is enlarged compared to the fluidized bed region 6 to prevent discharge of particles. A conduit 8 and nozzles 9 supply the reaction tube 2 with a fluidization gas. A conduit 10 and nozzles 11 supply a reaction gas mixture comprising hydrogen and silane and/or a halosilane (feed gas stream). The height of the nozzles 11 for supplying the reaction gas mixture may differ from the height of the nozzles 9 for supplying the fluidization gas. An apparatus 12 supplies the reactor tube 2 with seed particles at the reactor top 13. Finished granulate is withdrawn via a product withdrawal conduit 14 at the reactor bottom 15. Furthermore, at the reactor top 13 offgas is removed via an offgas withdrawal conduit 26. A sample stream for a gas chromatograph is typically withdrawn in the offgas withdrawal conduit 26.

The reactor is operated as follows. Feed gas is supplied to the reactor. Starting material in the form of silicon granulate is charged into the reactor and fluidized. In a heating phrase the heating output into the fluidized bed is increased. The energy increasing is carried out until a target value $T_{WS}$ has been achieved and the reactor is in a steady-state. In this state the reactor provides an optimal product quality and it is simultaneously ensured that the reactor achieves controlled production with a long running time. Stable product quality is characterized in that the chlorine content in the product is in a desired range. If the responding variable $T_{WS}$ exceeds a threshold value the reactor may suffer a premature outage, for example as a result of sintering of the granulate particles at the wall. If $T_{WS}$ falls below a threshold value this may result in undesirably high chlorine contents in the product.

The fluidization in the fluidized bed is controlled for the purpose of achieving an efficient process management with a long run time coupled with low dust formation. Fluidization is determined by the ratio of the gas velocity in the fluidized bed u and the minimum fluidization velocity $u_{mf}$ and may be calculated as a function of pressure and $T_{WS}$, Sauter diameter of the particles in the fluidized bed $d_S$, feed gas amount and composition and incipient fluidization porosity $\Psi_{mf}$. If the gas velocity is too low compared to $u_{mf}$ the fluidized bed is insufficiently fluidized and local hotspots may be formed, thus leading to incidences of sintering in the fluidized bed. If the gas velocity is too high compared to $u_{mf}$ the size of bubbles in the fluidized bed increases, thus leading to a higher dust formation rate in the process. For optimal process management the ratio $u/u_{mf}$ is kept constant by altering the gas amount and the particle size $d_S$ in the fluidized bed via the introduction of seed particles into the fluidized bed.

The fluidized bed temperature $T_{WS}$ is calculated via the energy and mass balance of the reactor.

Figure 2:
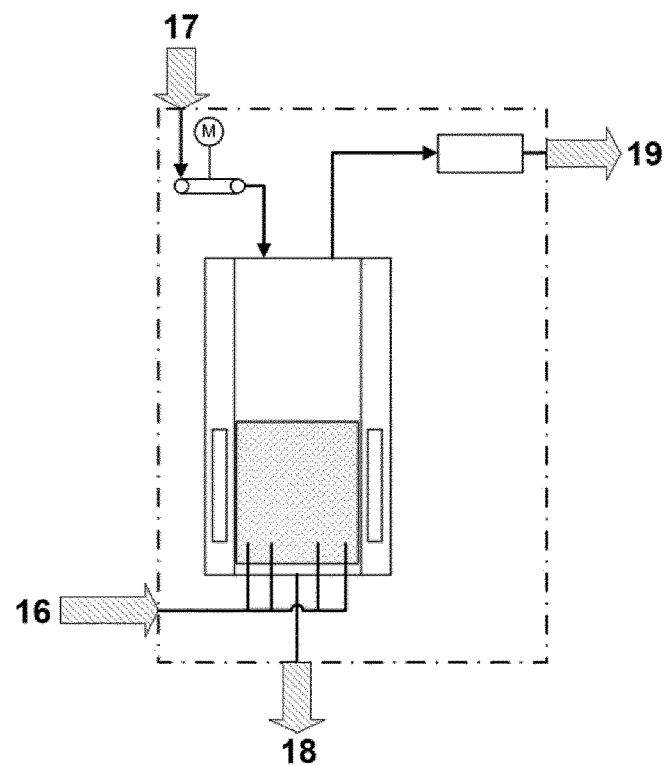
FIG. 2 shows a schematic view of the balance ambit for the mass balance.

FIG. 2 shows the balance ambit (dashed rectangle) for the mass balance forming the basis for the balance ambits I and II with reference to the reactor from FIG. 1. For the sake of clarity conduit 8 and nozzles 9 have been omitted. Renewed designation of the reactor elements has also been eschewed. The following amount-of-substance flows are balanced:
- Feed gas stream 16: $\dot{m}_{16,feedgas}$
- Seed particle stream to reactor 17: $\dot{m}_{17,KP,Reactor}$
- Product stream 18: $\dot{m}_{18,Product}$
- Offgas stream from the reactor 19: $\dot{m}_{19,offgas,Reactor}$ The amount-of-substance flows of the feed gas, the seed particles and the product (granulate) are measurable (for example mass flow meter) and thus known. The composition of the offgas stream (silane/chlorosilanes amount-of-substance fraction) from the reactor may be measured using a gas chromatograph. The result of the measurement is the amount-of-substance fraction of the chlorosilanes $y_i^*$ based on the total chlorosilane amount-of-substance flow in the offgas $[\text{mol}_i/\text{mol}_{chlorsilane}]$. The analytics are described in detail hereinbelow.

The amount-of-substance flows in the product stream and the offgas stream are calculated via key components and key reactions. The three elements Si, Cl and H are balanced. If the feed gas contains not only $H_2$ but also $SiCl_4$, $SiHCl_3$ and/or $SiH_2Cl_2$, seven relevant species occur (i=7): Si, $H_2$, HCl, $SiCl_4$, $SiHCl_3$, $SiH_2Cl_2$ and $SiH_3Cl$. In order to completely describe the system j=7−3=4 independent reaction equations are necessary.

$$4SiHCl_3 \rightarrow 3SiCl_4 + 2H_2 + Si \qquad (I)$$

$$SiHCl_3 + H_2 \rightarrow Si + 3HCl \qquad (II)$$

$$2SiHCl_3 \rightarrow SiCl_4 + SiH_2Cl_2 \qquad (III)$$

$$2SiH_2Cl_2 \rightarrow SiHCl_3 + SiH_3Cl \qquad (IV)$$

Corresponding to the four independent reaction equations there are 4 independent key components: $SiCl_4$, $SiHCl_3$, $SiH_2Cl_2$ and $SiH_3Cl$.

The extent of reaction $\xi_i$ indicates the progress of the partial reactions (I) to (IV). The change in amount of substance of a component is determinable via the extent of reaction.

The amount-of-substance flow of the chlorosilanes in the offgas is reduced by the reactions (I) and (II). The amount-of-substance flow of chlorosilane in the offgas may be calculated via the extents of reaction and the amount-of-substance flow of chlorosilane in the feed gas as:

$$\dot{N}_{Chlorosilane,offgas} = \dot{N}_{Chlorosilane,feed\ gas} - \xi_I - \xi_{II} \qquad (1)$$

The change in amount of substance of $SiCl_4$ is given by:

$$\Delta \dot{N}_{SiCl4} = \dot{N}_{SiCl4,offgas} - \dot{N}_{SiCl4,feed\ gas} = 3\xi_I + \xi_{III} \qquad (2)$$

The amount-of-substance flow of $SiCl_4$ in the offgas may be calculated via the amount-of-substance fraction of $SiCl_4$ in the offgas and the extents of reaction.

$$\dot{N}_{SiCl4,offgas} = y_{SiCl4} * \dot{N}_{Chlorosilane,offgas} = y_{SiCl4} * (\dot{N}_{Chlorosilane,feed\ gas} - \xi_I - \xi_{II}) \qquad (3)$$

For $SiCl_4$ equations (2) and (3) give:

$$y_{SiCl4} * (\dot{N}_{Chlorosilane,feed\ gas} - \xi_I - \xi_{II}) - \dot{N}_{SiCl4,feed\ gas} = 3\xi_I + \xi_{III} \qquad (4)$$

This equation is analogously derivable for the components $SiHCl_3$, $SiH_2Cl_2$ and $SiH_3Cl$. An unambiguously solvable equation system of four equations and the four unknown extents of reaction calculable therewith are thus obtained.

The extents of reaction make it possible to calculate the amount-of-substance flows in the offgas for all key components.

For example for $SiCl_4$:

$$\dot{N}_{SiCl4,offgas} = \dot{N}_{SiCl4,feed\ gas} + 3\xi_I + \xi_{III} \qquad (5)$$

It is thus possible to calculate the individual reaction conversions and the amount-of-substance flows for all components in the offgas.

Figure 3:
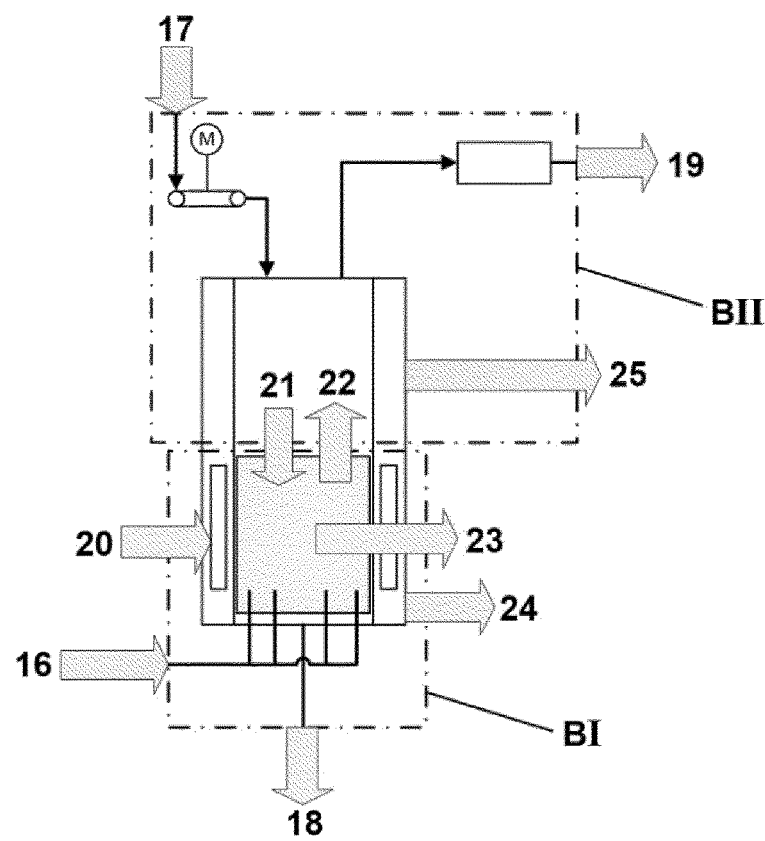
FIG. 3 shows schematic view of the balance ambits I and II for the energy balance.

FIG. 3 shows the balance ambit I (BI) and the balance ambit II (BII) for energy balance with reference to the reactor from FIG. 1.

To calculate the energy balance all amount-of-substance flows and energy streams crossing the boundaries of the respective balance ambit and the reaction enthalpy are calculated. The fluidized bed temperature $T_{WS}$ is calculated using balance ambit I and/or II.

Balance ambit I (BI) comprises:
feed gas stream 16: $\dot{m}_{16,feedgas}$
product stream 18: $\dot{m}_{18,Product}$
cooling stream 24 (energy removal from the reactor in the fluidized bed region): $Q_{24}$
reaction enthalpy 23: $\Delta_R H_{23}$
heating output of the heating apparatus 20; $Q_{20}$
seed particle stream into the fluidized bed 21: $\dot{m}_{21,KP,WS}$
offgas stream from the fluidized bed 22: $\dot{m}_{22,offgas,WS}$ Balance ambit II (BII) comprises:
seed particle stream into the fluidized bed 21: $\dot{m}_{21,KP,WS}$
offgas stream from the fluidized bed 22: $\dot{m}_{22,offgas,WS}$
seed particle stream into the reactor 17: $\dot{m}_{17,KP,Reactor}$
offgas stream from the reactor 19: $\dot{m}_{19,offgas,Reactor}$
cooling stream (energy removal from the reactor in the region above the fluidized bed) 25: $Q_{25}$ The enthalpy of amount-of-substance flows crossing the balance boundary is calculated as a function of $\dot{m}_i$, heat capacity $c_{p,i}$ and temperature $T_i$:

$$\dot{H}_i = \dot{m}_i * c_{p,i} * T_i \qquad (6)$$

The reactor is cooled via cooling media (for example in the reactor bottom) and the surroundings. The cooling output through cooling media is calculated via the enthalpy change of the cooling medium. Heat loss to the surroundings can be disregarded provided there is sufficient insulation. Heat loss to the surroundings by convection and radiation may optionally be estimated.

$$Q_{24/25} = \dot{m}_{cooling} * (c_{p,ein} * T_{ein} - c_{p,aus} * T_{aus}) \qquad (7)$$

In the case of electric heating the electrical output is captured. In the case of heating with a heating medium (for example combustion gases) the change in enthalpy of the heating medium is calculated.

$$Q_{20} = P_{electric} \text{ or } Q_{20} = \dot{m} * (c_{p,ein} * T_{ein} - c_{p,aus} * T_{aus}) \qquad (8)$$

The enthalpy of reaction is calculated via the sum of the standard enthalpy of formation of the reactants and the products. The reactant and product composition may be determined from the mass balance described hereinabove.

$$\Delta_R H_{23} = \Sigma \Delta H_{B,Products} - \Sigma \Delta H_{B,reactants} \qquad (9)$$

To calculate $T_{WS}$ the temperature of the offgas stream from the fluidized bed is calculated via the energy balance. Said stream has the same temperature as the fluidized bed on account of the thermal equilibrium in the fluidized bed. It is also assumed that the offgas stream from the fluidized bed 22 and the offgas stream from the reactor 24 have the same composition. For the seed particle stream into the fluidized bed 21 it is assumed that said stream has the same temperature as the offgas stream from the fluidized bed 22. For simplicity a quasi-stationary, isobaric process may be assumed. The sum of the energy and entropy streams crossing the balance boundary and the reaction enthalpy is 0.

For the balance ambit I resolving for the enthalpy $\dot{H}_{22}$ of the offgas mass stream from the fluidized bed gives:

$$\dot{H}_{22} = \dot{H}_{16} - \dot{H}_{18} - Q_{24} - \Delta_R H_{23} + Q_{20} + \dot{H}_{21} \qquad (10)$$

For the balance ambit II resolving for the enthalpy $\dot{H}_{22}$ of the offgas mass stream from the fluidized bed gives:

$$\dot{H}_{22} = -\dot{H}_{21} + \dot{H}_{17} - \dot{H}_{19} - Q_{25} \qquad (11)$$

The energy balance is resolved for the offgas mass flow from the fluidized bed region 22. The composition of the offgas mass flow is known via measurement by a gas chromatograph. The offgas mass flow may be calculated via the extents of reaction of the key reactions. The temperature of the offgas mass flow from the fluidized bed is calculated via the enthalpy of the offgas mass flow from the energy balance via the average specific heat capacity of the offgas stream.

$$T_{WS} = T_{22} = \frac{\dot{H}_{22}}{\dot{m}_{22} * c_{p,22}(T)} \quad (12)$$

The heat capacity is calculated as a function of temperature.

$$c_{p,i}(T) = a_0 + a_1 T + a_2 T^2 + a_3 T^3 + a_4 T^4 \quad (13)$$

Equation (12) can therefore be iteratively solved.

In a preferred embodiment of the process as a further manipulated variable the fluidization in the fluidized bed as the ratio of the superficial gas velocity u to the minimum fluidization velocity $u_{mf}$ may be controlled such that $u/u_{mf}$ is in a range from 1 to 6, preferably from 2 to 5, particularly preferably from 3 to 4 (secondary regulation).

The ratio of superficial gas velocity u to minimum fluidization velocity $u_{mf}$ is calculated as a parameter for fluidization in the fluidized bed. It is assumed that the gas composition in the fluidized bed has the same composition as the offgas from the reactor which is known via the mass balance. The mass balance makes it possible to calculate the average amount-of-substance weight $\overline{M}$ and the offgas amount-of-substance flow $\dot{N}$.

The density of the gas in the fluidized bed is calculated via the ideal gas law:

$$\rho_{Gas} = \frac{p\overline{M}}{RT}$$

The gas density is used to calculate the superficial gas velocity u in the fluidized bed. u is then given by equation (14):

$$u = \frac{\dot{N}\overline{M}}{A\rho_{Gas}}, \quad (14)$$

wherein
$\overline{M}$=average molar mass of the gas in the fluidized bed [kg/mol]
$\dot{N}$=amount-of-substance flow of the offgas from the fluidized bed [mol/s]
A=cross sectional area of the fluidized bed [m²]
$\rho_{Gas}$=density of the gas in the fluidized bed [kg/m³]
and wherein $u_{mf}$ is given by equation (15):

$$u_{mf} = 42,8(1-\psi)\frac{v}{d_S}\left[\sqrt{1+3,11*10^{-4}\frac{\Psi_{mf}^3}{(1-\Psi_{mf})^2}\frac{(\rho_{Particle}-\rho_{Gas})gd_S^3}{\rho_{Gas}v^2}}-1\right] \quad (15)$$

where
$\psi$=fixed bed porosity
v=viscosity of the gas in the fluidized bed [m²/s]
$d_S$=Sauter diameter of the particles in the fluidized bed [m]
$\Psi_{mf}$=incipient fluidization porosity
$\rho_{particle}$=density of the particles in the fluidized bed [kg/m³]
g=9.81 m/s².

It is preferable when the ratio $u/u_{mf}$ is kept constant during the process. The ratio $u/u_{mf}$ generally depends on temperature, pressure, gas amount and composition and the particle size in the fluidized bed. At an excessively low ratio $u/u_{mf}$ the feed gas amount to the fluidized bed may be increased and/or the particle size in the fluidized bed reduced by increased addition of seed particles. At an excessively high ratio $u/u_{mf}$ the gas amount to the fluidized bed may be reduced and/or the particle size in the fluidized bed increased by reduced addition of seed particles.

The density of the particles in the fluidized bed is preferably in a range from 2.250 to 2.330 g/cm³, particularly preferably from 2.280 to 2.330 g/cm³, in particular from 2.320 to 2.330 g/cm³.

The density of the silicon particles in the fluidized bed may be determined by gas adsorption methods (pycnometer) with helium gas, preferably with a Porotec Pycnomatic ATC instrument. The sample volume may be 60 mL for example.

The density of the gas in the fluidized bed $\rho_{gas}$ is preferably in a range from 0.5 to 2 kg/m³, particularly preferably from 0.7 to 1.2 kg/m³.

The porosity of the fixed bed $\psi$ is preferably in a range from 0.3 to 0.36 kg/m³, particularly preferably is 0.33.

The poured density $\rho$ of the fixed poured bed may be determined according to ISO 967, for example with an apparatus for determining poured density from Landgraf Laborsysteme HLL GmbH. The poured density $\rho$ may then be used to calculate the fixed bed porosity $\psi$ according to formula (16).

$$\psi = \frac{\rho_{Particle}-\rho}{\rho_{Particle}-\rho_{Gas}} \quad (16)$$

The incipient fluidization porosity $\Psi_{mf}$ is preferably in a range from 0.33 to 0.4, particularly preferably 0.37.

The incipient fluidization porosity $\Psi_{mf}$ may be determined experimentally (cf. VDI-Wärmeatlas [VDI Heat Atlas], 11th Edition, L3.2 Strömungsformen und Druckverlust in Wirbelschichten [Forms of flow and pressure loss in fluidized beds]). $\Psi_{mg}$ may be determined via the Ergun equation (17) at the point of incipient fluidization:

$$\frac{\Delta p}{L} = (1-\Psi_{mf})(\rho_{Particle}-\rho_{Gas})*g, \quad (17)$$

wherein
$\Delta p$: fluidized bed differential pressure at the point of incipient fluidization [bara],
L: height of the fluidized bed at the point of incipient fluidization [m].

The Sauter diameter of the particles in the fluidized bed reactor $d_S$ is preferably in a range from 150 to 10 000 μm, particularly preferably from 500 to 5000 μm, in particular from 850 to 2000 μm.

Determination of $d_S$ may be achieved with the silicon particles (granulate) obtained as product by means of image analysis using a particle analyzer with dynamic image analysis (for example CAMSIZER P4 from Retsch Technology, dynamische Bildanalyse according to ISO 13322-2, measurement range: 30 μm to 30 mm, type of analysis: dry measurement of powders and granulates).

In a further embodiment of the process as a manipulated variable the seed particle introduction amount in kilograms of seed particles per kilogram of silicon in the fluidized bed may be controlled such that it is in a range from 0.01 to 0.05, preferably from 0.02 to 0.03.

The mass flows $m_i$ of the seed particle and product streams may be measured with a continuous online flow system for bulk materials (for example MF3000 from Mütec Instruments).

The mass of the silicon in the fluidized bed may be continuously determined. To this end the differential pressure $\Delta p$ between the reactor bottom and the reactor top are continuously determined (for example with the electronic differential pressure system Deltabar FMD72 from Endress+Hauser).

$$\Delta p = p_{Bottom} - p_{top}$$

This differential pressure corresponds to the pressure drop over the fluidized bed. The pressure drop is proportional to the bed weight $m_{bed}$. This may be calculated as follows:

$$m_{Bed} = \frac{\Delta pA}{g},$$

wherein $m_{Bed}$: mass of the silicon in the fluidized bed [kg],
A: cross sectional area of the fluidized bed [m²].

The temperature of the fluidized bed $T_{WS}$ is preferably in a range from 700° C. to 1200° C., particularly preferably from 800° C. to 1150° C., in particular from 850° C. to 1100° C.

The granulate preferably has a chlorine content of 10 to 70 ppmw, particularly preferably of 15 to 40 ppmw.

The determination of the chlorine content in the bulk of the granulate may be achieved by instrumental neutron activation analysis (INAA; SEMI PV10). The chlorine content in the bulk is measured in units of "ppmw". Measurement by means of X-ray fluorescence analysis is also possible.

The composition of the offgas mass flow 22 may be determined with a gas chromatograph.

All components of the deposition reaction may be detected and quantified in the offgas via online analysis. The components are in particular chlorosilanes, hydrogen chloride and hydrogen. Employable measurement means include a gas chromatograph fitted with a flame ionization detector and a thermal conductivity detector. The composition of the chlorosilanes in the offgas $y_i^*$ needed for the mass balance may be output as the amount-of-substance fraction of the chlorosilane i based on the total chlorosilane amount-of-substance flow in the offgas.

The temperatures of the cooling, feed gas and offgas streams may generally be measured with a thermocouple (for example type K thermocouple according to DIN EN60584-1 having a range of measurement up to 1250° C.).

The mass flows $m_i$ of feed gas and cooling streams may be determined by means of a Coriolis mass flow meter (for example Endress+Hauser, Promass 83F).

The specific mass flow of silicon-containing feed gas is preferably 400 to 6500 kg/h*m². The specific hydrogen volume flow is preferably 800 to 4000 Nm³/(h*m²). The specific fluidized bed weight $m_{bed}$ is preferably 500 to 2000 kg/m². The specific silicon seed particle introduction rate is preferably 1 to 40 kg/(h*m²). The specific reactor heating power is preferably 800 to 3000 kW/m².

The electric heating output $P_{electric}$ may be determined as the output on the secondary side of a plant transformer according to DIN EN 60076.

The measurement of the recited parameters is preferably achieved continuously over the entire process duration.

As the feed gas, it is preferable to employ trichlorosilane or dichlorosilane as well as $H_2$. The fluidization gas is preferably selected from the group comprising $H_2$, argon, nitrogen and mixtures thereof.

The feed gas may be introduced into the fluidized bed via one or more nozzles. The local gas velocities at the exit from the nozzles are preferably 0.5 to 200 m/s. The concentration of the silicon-containing feed gas component based on the total gas amount flowing through the fluidized bed is preferably 5 to 50 mol %, particularly preferably 15 to 40 mol %.

The concentration of the silicon-containing feed gas component before entry into the reactor and based on the total feed gas amount is preferably 5 to 80 mol %, particularly preferably 14 to 60 mol %.

The absolute reactor pressure is preferably in the range from 1 to 10 bar, particularly preferably 1.5 to 5.5 bar.

Example

A fluidized bed reactor according to FIG. 1 is operated with trichlorosilane or dichlorosilane in addition to $H_2$ (cf. table 1).

The examples are performed in a reactor having a diameter of 400 mm. Table 1 relates to steady-state operating points of the reactor, i.e. the recited data were kept constant over several hours.

TABLE 1

| Chlorosilane | Pressure bara | Chlorosilane mass flow kg/h/m² | H₂ standard volume flow Nm³/h/m² | $T_{WS}$ (invention) ° C. | $T_{WS}$ (pyrometer) ° C. | HCl in offgas vol % | Cl in granulate ppmw |
|---|---|---|---|---|---|---|---|
| SiHCl3 | 4 | 3960 | 2550 | 950 | 815 | 1.80 | 31 |
| SiHCl3 | 4 | 1880 | 2950 | 950 | 920 | 1.55 | 33 |
| SiH2Cl2 | 4 | 1750 | 2990 | 760 | 625 | 0.5 | 1030 |
| SiH2Cl2 | 4 | 1750 | 2990 | 740 | 620 | 0.5 | 1380 |

The amounts of chlorosilane and $H_2$ in the feed gas are based on the cross sectional area of the reaction zone (fluidized bed). $T_{WS}$ (invention) is the temperature of the fluidized bed calculated according to the energy balance (see for example table II)

$T_{WS}$ (pyrometer) is a temperature of the fluidized bed measured using a pyrometer. The pyrometer is attached to the reactor top and directed onto the fluidized bed from above. Due to dust formation the measured signal is disturbed and the measured temperature is markedly below $T_{WS}$ (invention) calculated according to the invention.

EP2653446 A2 discloses that the HCl value in the offgas can be used to control the Cl value in the granulate. The HCl value in the offgas results from the chemical equilibrium in the fluidized bed. This chemical equilibrium is a function of pressure, temperature and the composition of the feed gas.

Table 1 shows that the Cl value in the granulate depends to a greater extent on $T_{WS}$ (invention) than on the HCl value in the offgas. Process control based on $T_{WS}$ (invention) is accordingly associated with an increase in product quality. If reactor control based on the HCl value in the offgas is effected a change in the reactor pressure, the chlorosilane or the feed gas amount to the reactor result in unacceptable enrichment of Cl in the granulate.

$T_{WS}$ (invention) was here determined via the balance ambit I (normalized over the cross sectional area of the reactor) (cf. table 2).

TABLE 2

| Feed gas enthalpy stream | $\dot{H}_{16}$ | 645.3 | kW/m² |
|---|---|---|---|
| Product enthalpy stream | $\dot{H}_{18}$ | −1.8 | kW/m² |
| Cooling enthalpy stream | $Q_{24}$ | −341.4 | kW/m² |
| Reaction enthalpy | $\Delta_R H_{23}$ | 164.8 | kW/m² |
| Heating output | $Q_{20}$ | 1556.2 | kW/m² |
| Seed particle enthalpy stream | $\dot{H}_{21}$ | 0.3 | kW/m² |
| Offgas from fluidized bed enthalpy stream | $\dot{H}_{22}$ | 1693.0 | kW/m² |
| Offgas stream heat capacity | $c_{p,22}$ | 1.6 | kJ/kgK |
| Offgas mass flow | $\dot{m}_{22}$ | 4050.6 | kg/h/m² |
| Offgas stream temperature | $T_{WS} = T_{22}$ | 948.1 | °C |

The invention claimed is:

1. A method of producing polycrystalline silicon granulate comprising:
   providing a reactor having a reactor tube with a fluidized bed region therein, the fluidized bed region being fluidized by a gas flow of a gas and heated by a heating apparatus;
   continuously supplying seed particles and a feed gas to the fluidized bed region, the feed gas including hydrogen, and silane and/or halosilane;
   determining a fluidized bed temperature ($T_{WS}$) based on an offgas stream temperature ($T_{offgas,WS}$) represented by formula (12):

$$T_{WS} = T_{offgas,WS} = \frac{\dot{H}_{22}}{\dot{m}_{22,offgas,WS} * c_{p,22}} \quad (12)$$

wherein, $\dot{m}_{22,offgas,WS}$ is an offgas mass flow from the fluidized bed region and $\dot{H}_{22}$ is an enthalpy of the offgas mass flow from the fluidized bed ($\dot{m}_{22,offgas,WS}$), and the enthalpy ($\dot{H}_{22}$) of the offgas mass flow from the fluidized bed is represented by formula (10):

$$\dot{H}_{22} = \dot{H}_{16} - \dot{H}_{18} - Q_{24} - \Delta_R H_{23} + Q_{20} + \dot{H}_{21} \quad (10),$$

wherein, $\dot{H}_{16}$ is an enthalpy of a feed gas stream ($\dot{m}_{16,feed\ gas}$), $\dot{H}_{18}$ is an enthalpy of a product stream $\dot{m}_{18,Product}$, $Q_{24}$ is energy removal from the reactor in the fluidized bed region, $\Delta_R H_{23}$ is a reaction enthalpy, $Q_{20}$ is a heating output of the heating apparatus, $\dot{H}_{21}$ is an enthalpy of a seed particle stream into the fluidized bed region ($\dot{m}_{21,KP,WS}$), and/or formula (11):

$$\dot{H}_{22} = -\dot{H}_{21} + \dot{H}_{17} - \dot{H}_{19} - Q_{25} \quad (11);$$

wherein, $\dot{H}_{17}$ is an enthalpy of the seed particle stream into the reactor ($\dot{m}_{17,KP,Reactor}$), H19 is an enthalpy of an offgas stream from the reactor (m19,offgas, Reactor), H21 is an enthalpy of a seed particle stream into the fluidized bed region ($m_{21,KP,WS}$), and Q25 is energy removal from the reactor in a region above the fluidized bed; and
   controlling the heating output ($Q_{20}$) of the heating apparatus such that the fluidized bed temperature ($T_{WS}$) is 700° C. to 1200° C., the heating output ($Q_{20}$) being 0.5 to 3 KW per kilogram of silicon in the reactor tube; and
   wherein, elemental silicon is deposited on the seed particles to form a polycrystalline silicon granulate product that is discharged from the reactor as the product stream.

2. The method of claim 1, wherein the heating output ($Q_{20}$) is 1 to 2 kW per kilogram of silicon in the reactor tube.

3. The method of claim 1, wherein the heating output ($Q_{20}$) is 1.3 to 1.6 kW per kilogram of silicon in the reactor tube.

4. The method of claim 1, further comprising controlling fluidization in the fluidized bed region such that a ratio ($u/u_{mf}$) of a superficial gas velocity (u) to a minimum fluidization velocity ($u_{mf}$) is 1 to 6, the superficial gas velocity (u) represented by formula (14):

$$u = \frac{\dot{N}M}{A\rho_{Gas}}, \text{ where} \quad (14)$$

wherein, $\overline{M}$ is an average molar mass of the gas in the fluidized bed region, $\dot{N}$ is an amount-of-substance flow of an offgas from the fluidized bed region, A is a cross-sectional area of the fluidized bed region, and $\rho_{Gas}$ is a density of the gas in the fluidized bed region, and $u_{mf}$ is represented by formula (15):

$$u_{mf} = 42.8(1-\psi)\frac{v}{d_S}\left[\sqrt{1+3.11*10^{-4}\frac{\Psi_{mf}^3}{(1-\Psi_{mf})^2}\frac{(\rho_{Particle}-\rho_{Gas})gd_S^3}{\rho_{Gas}v^2}} - 1\right] \quad (15)$$

wherein, ψ is a fixed bed porosity, ν is a viscosity of the gas in the fluidized bed region, $d_S$ is a Sauter diameter of the seed particles in the fluidized bed region, $\Psi_{mf}$ is an incipient fluidization porosity, $\rho_{particle}$ is a density of the seed particles in the fluidized bed region, and g is 9.81 m/s².

5. The method of claim 4, wherein the ratio ($u/u_{mf}$) is 2 to 5.

6. The method of claim 4, wherein the density of the seed particles in the fluidized bed region ($\rho_{particle}$) is 2.250 to 2.330 g/cm³.

7. The method of claim 4, wherein the density of the seed particles in the fluidized bed region ($\rho_{particle}$) is 2.280 to 2.330 g/cm³.

8. The method of claim 4, wherein the density of the gas in the fluidized bed region ($\rho_{gas}$) is 0.5 to 2 kg/m³.

9. The method of claim 4, wherein the density of the gas in the fluidized bed region ($\rho_{gas}$) is 0.7 to 1.2 kg/m³.

10. The method of claim 4, wherein the fixed bed porosity (ψ) is 0.3 to 0.36 kg/m³.

11. The method of claim 4, wherein the incipient fluidization porosity ($\Psi_{mf}$) is 0.33 to 0.4.

12. The method of claim 4, wherein the Sauter diameter of the seed particles in the fluidized bed region ($d_S$) is 150 to 10 000 μm.

13. The method of claim 4, wherein the Sauter diameter of the seed particles in the fluidized bed region ($d_S$) is 500 to 5000 μm.

14. The method of claim 1, wherein the seed particles are supplied at a rate of 0.01 to 0.05 kilograms of seed particles per kilogram of silicon in the reactor tube.

15. The method of claim 1, wherein the seed particles are supplied at a rate of 0.02 to 0.03 kilograms of seed particles per kilogram of silicon in the reactor tube.

16. The method of claim 1, wherein the fluidized bed temperature ($T_{WS}$) is 800° C. to 1150° C.

17. The method of claim 1, wherein the fluidized bed temperature ($T_{WS}$) is 850° C. to 1100° C.

18. The method of claim 1, wherein the polycrystalline silicon granulate product has a chlorine content of 10 to 70 ppmw.

19. The method of claim 1, wherein the polycrystalline silicon granulate product has a chlorine content of 15 to 40 ppmw.

20. The method of claim 1, further comprising determining a composition of an offgas stream via a gas chromatograph.

\* \* \* \* \*